(12) United States Patent
Lee et al.

(10) Patent No.: US 8,679,376 B2
(45) Date of Patent: Mar. 25, 2014

(54) DICHROIC DYE FOR USE IN POLARIZING FILM, POLARIZING FILM, AND DISPLAY DEVICE INCLUDING THE POLARIZING FILM

(71) Applicant: Samsung Electronics Co., Ltd., Suwon-si (KR)

(72) Inventors: Yong-Joo Lee, Suwon-si (KR); Deuk-Kyu Moon, Seoul (KR); Jong-Hoon Won, Yongin-si (KR); Myung-Man Kim, Suwon-si (KR); Myung-Sup Jung, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/789,206

(22) Filed: Mar. 7, 2013

(65) Prior Publication Data

US 2013/0234082 A1    Sep. 12, 2013

(30) Foreign Application Priority Data

Mar. 9, 2012   (KR) ........................ 10-2012-0024664

(51) Int. Cl.
*F21V 9/14*   (2006.01)
*G02B 5/30*   (2006.01)
*G02C 7/12*   (2006.01)
*C09B 35/02*  (2006.01)

(52) U.S. Cl.
USPC .............. 252/585; 8/639; 8/664; 252/299.62; 349/96; 359/485.01; 359/492.01; 534/797; 534/811; 534/812; 534/831

(58) Field of Classification Search
USPC ............ 8/639, 664; 252/299.01, 586, 299.62, 252/585; 349/96; 359/487.02, 489.19, 359/492.01, 485.01; 427/163.1; 428/1.1, 428/220; 534/575, 797, 811, 812, 831
See application file for complete search history.

(56) References Cited

FOREIGN PATENT DOCUMENTS

| DE | 2840825 | * | 4/1980 | ............... D06P 7/00 |
|---|---|---|---|---|
| EP | 1256602 A1 | | 11/2002 | |
| EP | 1452338 A1 | | 9/2004 | |
| JP | 2007-071973 A | | 3/2007 | |

OTHER PUBLICATIONS

Emoto, A. et al., Asymmetric Polarization Conversion in Polarization Holograms with Surface Relief, Japanese J. of Applied Physics, vol. 47 (5): 3568-3571.

* cited by examiner

*Primary Examiner* — Bijan Ahvazi
(74) *Attorney, Agent, or Firm* — Cantor Colburn LLP

(57) ABSTRACT

A polarization film, including a polymer resin, and a dichroic dye dispersed in the polymer resin and represented by the following Chemical Formula 1:

Chemical Formula 1

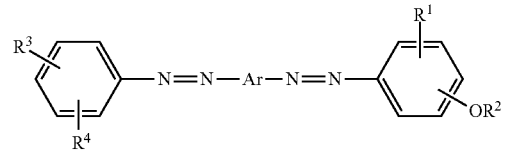

wherein, in Chemical Formula 1, Ar, $R^1$ to $R^4$ are the same as those defined in the detailed description.

16 Claims, 6 Drawing Sheets

DICHROIC DYE FOR USE IN POLARIZING FILM, POLARIZING FILM, AND DISPLAY DEVICE INCLUDING THE POLARIZING FILM

CROSS-REFERENCE TO RELATED APPLICATION

This application claims priority to Korean Patent Application No. 10-2012-0024664 filed in the Korean Intellectual Property Office on Mar. 9, 2012, and all the benefits accruing therefrom under 35 U.S.C. §119, the contents of which in their entirety are herein incorporated by reference.

BACKGROUND

1. Field

A dichroic dye for use in a polarization film, a polarization film, and a display device including the polarization film are disclosed.

2. Description of the Related Art

A display device such as a liquid crystal display ("LCD") and an organic light emitting diode ("OLED") display includes a polarizing plate outside of the display panel of the display device. The polarizing plate may transmit light vibrating in a particular direction but absorb or reflect light vibrating in all other directions, and thus control the direction of incident light impinging on the display panel or emitted light from the display panel.

In general, the polarizing plate includes a polarizer and a protection layer for protecting the polarizer. The polarizer may be prepared by adsorbing and orienting, for example, iodine or a dichroic dye in polyvinylalcohol ("PVA"). The protection layer may be, for example, triacetyl cellulose ("TAC").

However, the polarizing plate including the polarizer and the protection layer is thick, which may affect the thickness of a display device, and is fabricated in a complex and expensive process.

Accordingly, a polarization film including a polymer resin and a dichroic dye, and requiring no protection layer has been researched. Development of such a polarization film could reduce the thickness of the display device and/or simplify fabrication of the display device.

SUMMARY

An embodiment provides a dichroic dye having improved polarization properties.

Another embodiment provides a polarization film including the dichroic dye.

Yet another embodiment provides a display device including the polarization film.

According to an embodiment, a dichroic dye for a polarization film represented by the following Chemical Formula 1 is provided.

Chemical Formula 1

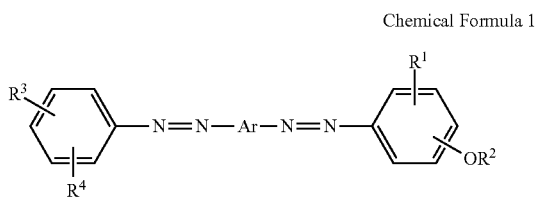

In Chemical Formula 1,

Ar is a substituted or unsubstituted C6 to C15 arylene group, $R^1$ is a substituted or unsubstituted C1 to C5 alkyl group, $R^2$ is a substituted or unsubstituted C2 to C20 alkyl group, a substituted or unsubstituted C3 to C20 cycloalkyl group, or a combination thereof, and $R^3$ and $R^4$ are each independently hydrogen, a substituted or unsubstituted C1 to C30 alkyl group, a substituted or unsubstituted C3 to C30 cycloalkyl group, or a combination thereof.

The dichroic dye may be represented by the following Chemical Formula 1a.

Chemical Formula 1a

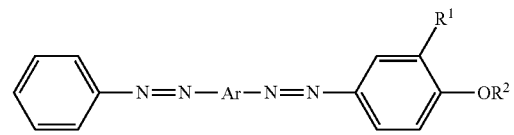

In Chemical Formula 1a,

Ar is a substituted or unsubstituted C6 to C15 arylene group, $R^1$ is a substituted or unsubstituted C1 to C5 alkyl group, and $R^2$ is a substituted or unsubstituted C2 to C20 alkyl group, a substituted or unsubstituted C3 to C20 cycloalkyl group, or a combination thereof.

Ar of the above Chemical Formulae 1 and 1a may include a substituted or unsubstituted phenylene group, a substituted or unsubstituted naphthalene group, a substituted or unsubstituted biphenylene group, or a combination thereof.

According to another embodiment, a polarization film that includes a polymer resin and a dichroic dye dispersed in the polymer resin and represented by the following Chemical Formula 1, is provided.

Chemical Formula 1

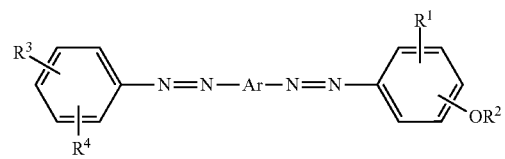

In Chemical Formula 1,

Ar is a substituted or unsubstituted C6 to C15 arylene group, $R^1$ is a substituted or unsubstituted C1 to C5 alkyl group, $R^2$ is a substituted or unsubstituted C2 to C20 alkyl group, a substituted or unsubstituted C3 to C20 cycloalkyl group, or a combination thereof, and $R^3$ and $R^4$ are each independently hydrogen, a substituted or unsubstituted C1 to C30 alkyl group, a substituted or unsubstituted C3 to C30 cycloalkyl group, or a combination thereof.

The dichroic dye may be represented by the following Chemical Formula 1a.

Chemical Formula 1a

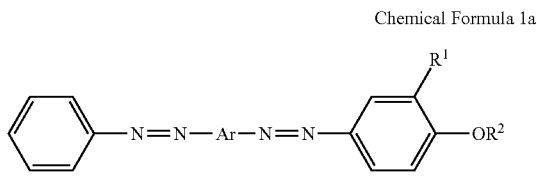

In Chemical Formula 1a,

Ar is a substituted or unsubstituted C6 to C15 arylene group, $R^1$ is a substituted or unsubstituted C1 to C5 alkyl group, and $R^2$ is a substituted or unsubstituted C2 to C20 alkyl group, a substituted or unsubstituted C3 to C20 cycloalkyl group, or a combination thereof.

Ar of the above Chemical Formulae 1 and 1a may include a substituted or unsubstituted phenylene group, a substituted or unsubstituted naphthylene group, a substituted or unsubstituted biphenylene group, or a combination thereof.

The dichroic dye may be included in an amount of about 0.01 to about 5 parts by weight based on 100 parts by weight of the polymer resin.

The dichroic dye may have a dichroic ratio of about 3 to about 10 in a visible ray wavelength region of about 380 nm to about 780 nm.

The dichroic dye may have absorbance of less than about 0.8 in a visible ray wavelength region of about 380 nm to about 780 nm.

The polarization film may have light transmittance of greater than or equal to about 17% and polarization efficiency of greater than or equal to about 90% in a visible ray wavelength region of about 380 nm to about 780 nm.

The polymer resin may be a hydrophobic polymer resin.

The polymer resin may include polyethylene ("PE"), polypropylene ("PP"), polyethylene terephthalate ("PET"), polyethylene terephthalate glycol ("PETG"), nylon, a copolymer of one of the foregoing polymer resins, or a combination comprising at least one of any of the foregoing polymer resins.

The dichroic dye may be a yellow dichroic dye, and the polarization film may further include at least one of a red dichroic dye and a blue dichroic dye dispersed in the polymer resin.

The polarization film may have absorption properties in the entire visible ray wavelength region ranging from about 380 nm to about 780 nm.

According to another embodiment, a display device including the polarization film is provided.

The display device may be a liquid crystal display (LCD) or an organic light emitting diode (OLED) display.

DETAILED DESCRIPTION

Figure 1:
FIG. 1 is a cross-sectional view of an exemplary embodiment of an LCD.

This disclosure will be described more fully hereinafter with reference to the accompanying drawings, in which exemplary embodiments are shown. This disclosure may, however, be embodied in many different forms and should not be construed as limited to the exemplary embodiments set forth herein. Rather, these embodiments are provided so that this disclosure will be thorough and complete, and will fully convey the scope of the claims to those skilled in the art.

It will be understood that when an element is referred to as being "on" another element, it can be directly on the other element or intervening elements may be present therebetween. In contrast, when an element is referred to as being "directly on" another element, there are no intervening elements present. As used herein, "or" means "and/or," and the term "and/or" includes any and all combinations of one or more of the associated listed items.

It will further be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer, or section discussed below could be termed a second element, component, region, layer, or section without departing from the teachings of the present invention.

The terminology used herein is for the purpose of describing particular embodiments only and is not intended to be limiting. As used herein, the singular forms "a," "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, the term "substituted" may refer to a hydrogen atom (e.g., 1, 2, 3, or 4 hydrogen atoms) substituted with a group selected from a halogen (F, Br, Cl, or I), an alkoxy group (—OR wherein R is a C1 to C20 alkyl group, a C2 to C20 alkenyl group, or a C2 to C20 alkynyl group), a cyano group (—CN), an amino group (—NH$_2$), an ester group (—CO$_2$R wherein R is a C1 to C20 alkyl group, a C2 to C20 alkenyl group, or a C2 to C20 alkynyl group), a C1 to C20 alkyl group, a C2 to C20 alkenyl group, a C2 to C20 alkynyl group, and a combination thereof, provided that the valence of the moiety being substituted is not exceeded.

The term "arylene" as used herein may refer to a divalent or higher radical formed by the removal of two or more hydrogen atoms from one or more rings of an aromatic hydrocarbon, wherein the hydrogen atoms may be removed from the same or different rings (preferably different rings), each of which rings may be aromatic or nonaromatic. "Aromatic hydrocarbon" is a cyclic hydrocarbon with alternating carbon and single bonds between carbon atoms.

"Heteroarylene" means a divalent or higher radical formed by the removal of at least two hydrogen atoms from one or more rings of carbocyclic ring group that includes one or more aromatic rings, in which at least one ring member (e.g., one, two or three ring members) is a heteroatom, each of which rings may be aromatic or nonaromatic, and wherein the hydrogen atoms may be removed from the same or different rings (preferably the same ring). Multiple rings, if present, may be spiro or fused. The heteroatom(s) are generally independently selected from nitrogen (N), oxygen (O), phosphorus (P), sulfur (S), boron (B), or silicon (Si),).

"Alkyl" as used herein may refer to a straight or branched chain saturated aliphatic hydrocarbon having the specified number of carbon atoms, specifically 1 to 12 carbon atoms, more specifically 1 to 6 carbon atoms. Alkyl groups include, for example, groups having from 1 to 50 carbon atoms (C1 to C50 alkyl).

"Cycloalkyl" as used herein may refer to a group that comprises one or more saturated and/or partially saturated rings in which all ring members are carbon, such as cyclopropyl, cyclobutyl, cyclopentyl, cyclohexyl, cycloheptyl, cyclooctyl, adamantyl and partially saturated variants of the foregoing, such as cycloalkenyl groups (e.g., cyclohexenyl) or cycloalkynyl groups. Cycloalkyl groups do not include an aromatic ring or a heterocyclic ring. When the numbers of carbon atoms is specified (e.g., C3 to C15 cycloalkyl), the number means the number of ring members present in the one or more rings.

"Alkenyl" as used herein may refer to a straight or branched chain, monovalent hydrocarbon group having at least one carbon-carbon double bond (e.g., ethenyl (—HC=CH$_2$)).

"Alkynyl" as used herein may refer to a straight or branched chain, monovalent hydrocarbon group having at least one carbon-carbon triple bond (e.g., ethynyl).

Hereinafter, a polarization film according to an embodiment is described.

The polarization film according to an embodiment includes a polymer resin and a dichroic dye.

The polymer resin may be a hydrophobic polymer resin, for example a polyester resin such as polyethylene terephthalate (PET), polyethylene terephthalate glycol (PETG), and polyethylene naphthalate; an alkyl acrylate-based resin such as polymethyl(meth)acrylate; a styrene-based resin such as polystyrene (PS) and an acrylonitrile-styrene copolymer; a polycarbonate-based resin; a polyolefin-based resin such as polyethylene (PE), polypropylene (PP), and a copolymer thereof; a vinyl chloride-based resin; an amide-based resin such as nylon and an aromatic polyamide; an imide-based resin; a sulfone-based resin; a polyether sulfone-based resin; a polyether-etherketone-based resin; a polyphenylene sulfide-based resin; a vinylalcohol-based resin; a vinylidene chloride-based resin; a vinylbutyral-based resin; an arylate-based resin; a polyoxymethylene-based resin; an epoxy-based resin; a cycloolefin-based resin; or a combination thereof. Copolymers of any of the foregoing resins can be used. In an embodiment the polymer resin may be a polyester, a polyamide, a polyolefin, a copolymer of the foregoing polymer resins, and a combination thereof.

In an embodiment, the polymer resin may be, for example, polyethylene (PE), polypropylene (PP), a polyester such as polyethylene terephthalate (PET), polyethylene terephthalate glycol (PETG) nylon, a copolymer of any of the foregoing resins, or a combination of any of the foregoing polymer resins.

The dichroic dye is a material transmitting one perpendicular polarization component out of two perpendicular polarization components in a predetermined wavelength region.

The dichroic dye may be dispersed in the polymer resin, and the combination may be elongated (i.e., stretched), and is thus arranged in one direction (i.e., the dichroic dye molecules are aligned in one direction).

The dichroic dye may be represented by the following Chemical Formula 1.

Chemical Formula 1

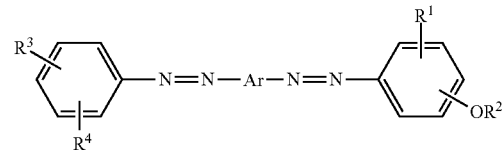

In Chemical Formula 1,

Ar is a substituted or unsubstituted C6 to C15 arylene group, R$^1$ is a substituted or unsubstituted C1 to C5 alkyl group, R$^2$ is a substituted or unsubstituted C2 to C20 alkyl group, a substituted or unsubstituted C3 to C20 cycloalkyl group, or a combination thereof, or R$^2$ is an unsubstituted C2 to C20 alkyl group, more specifically an unsubstituted C2 to C12 alkyl group, and R$^3$ and R$^4$ are each independently hydrogen, a substituted or unsubstituted C1 to C30 alkyl group, a substituted or unsubstituted C3 to C30 cycloalkyl group, or a combination thereof.

In a specific embodiment, Ar may include a substituted or unsubstituted phenylene group, a substituted or unsubstituted naphthylene group, a substituted or unsubstituted biphenylene group, or a combination thereof.

The dichroic dye includes a chromophore including two azo groups and a plurality of aryl groups, wherein at least one of the aryl groups is substituted with two substituents.

The R$^1$ group, one of the substituents, is positioned at the end of the dichroic dye. Without being bound by theory, the presence of the R$^1$ group endows the dichroic dye molecule with a three-dimensional property, and thus may prevent stacking of the neighboring dichroic dye molecules. This, in turn, may lead to a better dispersion of the dichroic dye molecules in the polymer resin, and may prevent transformation of optical properties of the polymer.

Again without being bound by theory, the other substituent, an $OR^2$ group, may increase the hydrophobic property of the dichroic dye and thus compatibility of the dichroic dye with the hydrophobic polymer resin.

In a specific embodiment, $R^1$ is an unsubstituted C1 to C5 alkyl group, $R^2$ may be an unsubstituted C2 to C20 alkyl group, specifically an unsubstituted C2 to C12 alkyl group, and $R^3$ and $R^4$ may each independently be hydrogen.

The dichroic dye may be, for example, represented by the following Chemical Formula 1a.

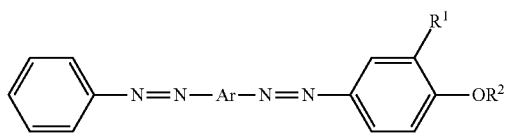

Chemical Formula 1a

In Chemical Formula 1a, Ar, $R^1$, and $R^2$ are the same as defined above in Chemical Formula 1. In particular, Ar may be a substituted or unsubstituted phenylene group, a substituted or unsubstituted naphthylene group, a substituted or unsubstituted biphenylene group, or a combination thereof, $R^1$ may be an unsubstituted C1 to C5 alkyl group, $R^2$ may be an unsubstituted C2 to C20 alkyl group, specifically an unsubstituted C2 to C12 alkyl group, and $R^3$ and $R^4$ may each independently be hydrogen.

The dichroic dye may have a dichroic ratio of about 3 to about 10 in a visible ray wavelength region of about 380 nm to about 780 nm. Herein, the dichroic ratio is a value obtained by dividing the polarization absorption in a direction parallel to the polymer chain by the polarization absorption in a direction perpendicular to the polymer chain. The dichroic ratio may indicate the extent to which the dichroic dye is arrayed in one direction. A dichroic dye that has a dichroic ratio within the above range thus may be arrayed in the direction of the polymer chain, thus improving polarization properties of the polymer.

The dichroic dye may have the absorbance value of less than about 0.8 in a visible ray wavelength region of about 380 nm to about 780 nm. When the dichroic dye has the absorbance value within this range, excellent color reproducibility may be accomplished.

The polarization film may have light transmittance of greater than or equal to about 17% and polarization efficiency of greater than or equal to about 90% in a visible ray wavelength region of about 380 nm to about 780 nm. When the polarization film simultaneously has light transmittance and polarization efficiency within the range, a clear image may be obtained.

The dichroic dye may be a yellow dichroic dye, and the polarization film may further include at least one of a red dichroic dye and a blue dichroic dye dispersed in the polymer resin. When the polarization film is fabricated to include a mixture of dichroic dyes expressing different colors, it may have light absorption characteristics in the entire visible ray wavelength regions ranging from about 380 nm to 780 nm. Accordingly, the polarization film may play a role of a light absorption layer in a display device, for example, an organic light emitting diode (OLED) display.

When the solubility parameter of the dichroic dye has a smaller difference from that of the polymer resin, the dichroic dye may be easily melt-blended during the fabrication of the polarization film. For example, the dichroic dye and the polymer resin may have a solubility parameter difference of less than or equal to about 10, or less than or equal to about 8, or less than or equal to about 6.

The dichroic dye may have a solubility parameter ranging from about 15 to about 30, and specifically, from about 18 to about 25. When the dichroic dye has a solubility parameter within these ranges, the dichroic dye may be better melt-blended with the hydrophobic polymer resin.

The dichroic dye may be included in an amount of about 0.01 to about 5 parts by weight based on 100 parts by weight of the polymer resin. When the amount of the dichroic dye is within this range, the transparency of the polarization film is not deteriorated and sufficient polarization properties of the film are thereby preserved. Specifically, the dichroic dye may be included in an amount of about 0.05 to about 1.5 parts by weight, and more specifically, in an amount of about 0.05 to about 1 part by weight based on 100 parts by weight of the polymer resin.

The polarization film may be fabricated by combining, for example by melt-blending the polymer resin and the dichroic dye and elongating a sheet of the composition.

For example, a method of fabricating the polarization film may include melt-blending the polymer resin and the dichroic dye at a processing temperature effective to melt the polymer resin, but not degrade the polymer resin or the dichroic dye, forming a sheet by extrusion or molding (e.g., putting the resulting molten mixture in a mold and compressing it), and elongating the resulting sheet in one direction.

The melt blending may be performed at a temperature, for example, less than or equal to about 300° C., and specifically, from about 100° C. to about 250° C.

The sheet formation may be performed by putting the resulting molten mixture in the mold and compressing it by applying high pressure, or discharging the molten mixture in a chill roll through a T-die.

This one-directional elongation may be performed at a rate from about 300% to about 1000%, and specifically, from about 300% to about 800% at a temperature from about 30° C. to about 200° C. Herein, the elongation rate refers to a ratio of the lengths of the material before and after sheet elongation (that is, how much longer the sheet becomes after the elongation in one direction). The one-directional elongation may be performed by any methods, for example roll stretching or tenter stretching.

The thickness of the polarization film after elongation may vary depending on the particular application of the film, for example from about 10 nanometer (nm) to about 10 millimeter (mm). When used in a display device, the polarization film may have a thickness from about 500 nm to about 50 micrometers, or from about 500 nm to about 10 micrometers, or from about 750 nm to about 5 micrometers.

The polarization film may be utilized in various display devices.

The display device may be a liquid crystal display (LCD).

FIG. 1 is a cross-sectional view of an exemplary embodiment of an LCD.

Referring to FIG. 1, the LCD according to an embodiment includes a liquid crystal display panel 10 and a polarization film 20 disposed on both the lower side and the upper side of the liquid crystal display panel 10.

The liquid crystal display panel 10 may be a twist nematic ("TN") mode panel, a patterned vertical alignment ("PVA") mode panel, an in plane switching ("IPS") mode panel, an optically compensated bend ("OCB") mode panel, and the like.

The liquid crystal display panel 10 includes a first display panel 100, a second display panel 200, and a liquid crystal layer 300 interposed between the first display panel 100 and the second display panel 200.

The first display panel 100 may include, for example, a thin film transistor (not shown) formed on a substrate (not shown) and a first field generating electrode (not shown) connected thereto. The second display panel 200 may include, for example, a color filter (not shown) formed on the substrate and a second field generating electrode (not shown). However, a color filter may be included in the first display panel 100 or along with the first and second field generating electrodes in the first display panel 100.

The liquid crystal layer 300 may include a plurality of liquid crystal molecules. The liquid crystal molecules may have positive or negative dielectric anisotropy. When the liquid crystal molecules have positive dielectric anisotropy, the long axes thereof may be aligned substantially parallel to the surface of the first display panel 100 and the second display panel 200 when the electric field is not applied, and may be aligned substantially perpendicular to the surface of the first display panel 100 and the second display panel 200 when the electric field is applied. On the contrary, when the liquid crystal molecules have negative dielectric anisotropy, the long axes thereof may be aligned substantially perpendicular to the surface of the first display panel 100 and the second display panel 200 when the electric field is not applied, and may be aligned substantially parallel to the surface of the first display panel 100 and the second display panel 200 when the electric field is applied.

The polarization film 20 is disposed on the outside of the liquid crystal display panel 10. Although the polarization film 20 is shown to be disposed on the upper side and lower side of the liquid crystal display panel 10 in the drawing, it may be formed on either the upper side or the lower side of the liquid crystal display panel 10.

The polarization film 20 includes the polymer resin and dichroic dye which are described above.

The display device may be an organic light emitting diode (OLED) display.

Figure 2:
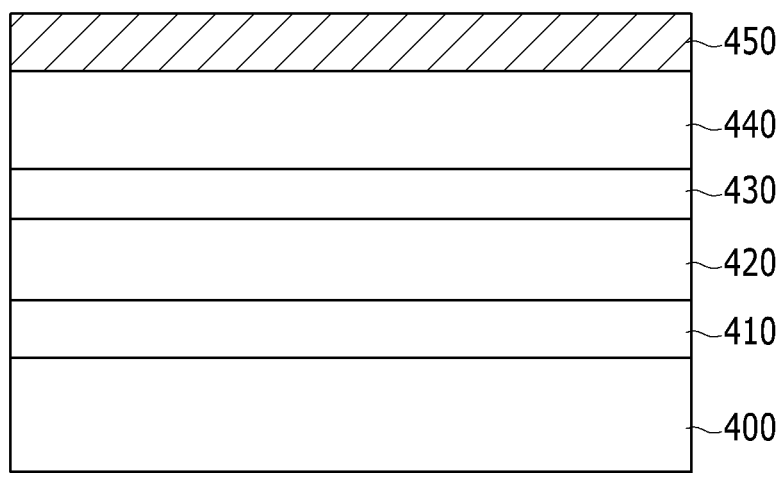
FIG. 2 is a cross-sectional view of an exemplary embodiment of an OLED display.

FIG. 2 is a cross-sectional view of an exemplary embodiment of an OLED display.

Referring to FIG. 2, the organic light emitting diode display includes a base substrate 400, a lower electrode 410, an organic emission layer 420, an upper electrode 430, an encapsulation substrate 440, and a polarization film 450.

The base substrate 400 may be made of glass or plastic.

Either the lower electrode 410 or the upper electrode 430 may be an anode, while the other electrode may be a cathode. The anode is an electrode into which the holes are injected. It may be made of a transparent conductive material having a high work function and transmitting an emitted light, for example, ITO or IZO. The cathode is an electrode in which the electrons are injected. It may be made of a conductive material having a low work function and no influence on an organic material, for example, aluminum (Al), calcium (Ca), and barium (Ba).

An organic emission layer 420 includes an organic material emitting light when voltage is applied to the lower electrode 410 and the upper electrode 430.

An auxiliary layer (not shown) is positioned between the lower electrode 410 and the organic emission layer 420 and between the upper electrode 430 and the organic emission layer 420. The auxiliary layer may include a hole transport layer ("HTL"), a hole injection layer ("HIL"), an electron injection layer ("EIL"), and an electron transport layer ("ETL") in order to balance the electrons and holes.

The encapsulation substrate 440 may be made of glass, metal, or polymer. It is used to seal the lower electrode 410, the organic emission layer 420, and the upper electrode 430 to prevent moisture and/or oxygen from flowing therein.

The polarization film 450 may be disposed at the side where the light is emitted. For example, the polarization film 450 may be disposed at the outside of the base substrate 400 in the bottom emission type wherein the light is emitted toward the base substrate 400, while the polarization film 450 may be disposed at the outside of the encapsulation substrate 440 in the top emission type wherein the light is emitted toward the encapsulation substrate 440.

The polarization film 20 includes a polymer resin and a dichroic dye as described above, and absorbs the external light, preventing the display characteristics from being deteriorated by the reflection of the external light.

Hereinafter, embodiments are illustrated in more detail with reference to examples described below. However, these examples are provided for illustrative purposes only and are not intended to limit the scope of the embodiments.

Synthesis of Dichroic Dye

Synthesis Example 1

2 g (6.32 mmol) of Disperse Yellow 7 is dissolved in 50 mL of acetone, and 1.1 mL (7.84 mol) of 1-bromohexane and 1.75 g (12.66 mmol) of potassium carbonate ($K_2CO_3$) are added thereto. The reaction mixture is agitated at 60° C. for 10 hours and cooled to room temperature. The resulting reactant is concentrated and then purified through silica gel column chromatography ($CH_2Cl_2$:n-hexane=2:1), preparing 2.38 g (5.94 mmol) of a dichroic dye represented by the following Chemical Formula 1aa. The dichroic dye has a yield of 94%.

Reaction Scheme 1

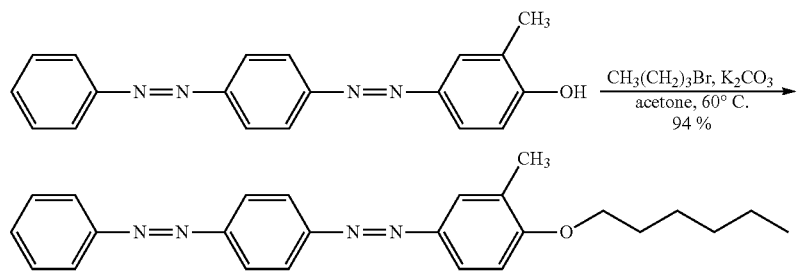

Chemical Formula 1aa

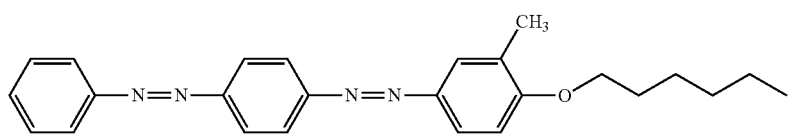

The structure of the dichroic dye represented by the above Chemical Formula 1aa was confirmed by the $^1$H NMR analysis.

The $^1$H NMR analysis results are as follows.

$^1$H NMR (300 MHz, CDCl$_3$) δ (ppm): 0.94 (t, J=6.9 Hz, 3H, CH$_3$), 1.35-1.40 (m, 4H, CH$_2$×2), 1.49-1.56 (m, 2H, CH$_2$), 1.82-1.88 (m, 2H, CH$_2$), 2.31 (s, 3H, CH$_3$), 4.07 (t, J=6.5 Hz, 2H, OCH$_2$), 6.94 (d, J=8.3 Hz, 1H, ArH), 7.45-7.54 (m, 3H, ArH), 7.82-7.84 (m, 2H, ArH), 7.94-8.06 (m, 6H, ArH).

The dichroic dye represented by the above Chemical Formula 1aa has a solubility parameter of 21.4 and an aspect ratio of 4.1.

Synthesis Example 2

1 g (3.16 mmol) of Disperse Yellow 7 is dissolved in 30 mL of acetone, and then 0.28 mL (3.75 mol) of bromoethane and 0.87 g (6.29 mmol) of potassium carbonate (K$_2$CO$_3$) are added thereto. The reaction mixture is agitated at 60° C. for 10 hours and cooled to room temperature. The resulting reactant is concentrated and then purified through silica gel column chromatography (CH$_2$Cl$_2$:n-hexane=2:1), preparing 1.05 g (3.05 mmol) of a dichroic dye represented by the following Chemical Formula 1ab. The dichroic dye has a yield of 97%.

Chemical Formula 1ab

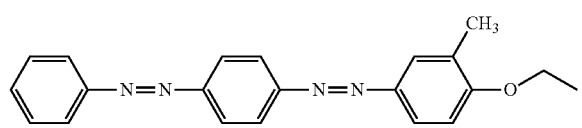

The structure of the dichroic dye represented by the above Chemical Formula 1ab was confirmed by the $^1$H NMR analysis.

The $^1$H NMR analysis results are as follows.

$^1$H NMR (300 MHz, CDCl$_3$) δ (ppm): 1.48 (t, J=6.9 Hz, 3H, OCH$_2$CH$_3$), 2.31 (s, 3H, CH$_3$), 4.13 (q, J=6.9 Hz, 2H, OCH$_2$CH$_3$), 6.93 (d, J=8.3 Hz, 1H, ArH), 7.46-7.54 (m, 3H, ArH), 7.81-7.84 (m, 2H, ArH), 7.94-8.07 (m, 6H, ArH).

The dichroic dye represented by the above Chemical Formula 1ab has a solubility parameter of 23.3 and an aspect ratio of 4.1.

Comparative Synthesis Example 1 g (2.84 mmol) of Disperse Orange 13 is dissolved in 30 mL of acetone, and then 0.48 mL (3.75 mol) of 1-bromohexane and 0.78 g (5.64 mmol) of potassium carbonate (K$_2$CO$_3$) are added thereto. The resulting reactant is agitated at 60° C. for 10 hours and cooled to room temperature. The resulting reactant is concentrated and then purified through silica gel column chromatography (CH$_2$Cl$_2$:n-hexane=2:1), obtaining 1.15 g (2.63 mmol) of a dichroic dye represented by the Reaction Scheme 2

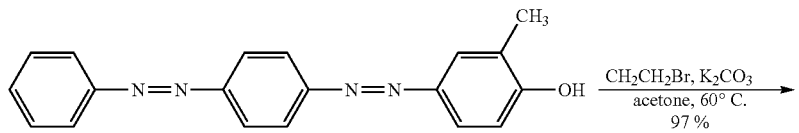

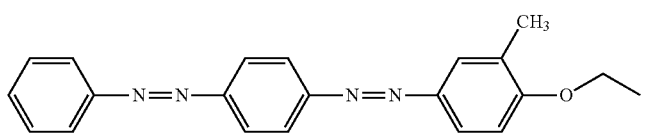

following Chemical Formula A. The dichroic dye has a yield of 93%.

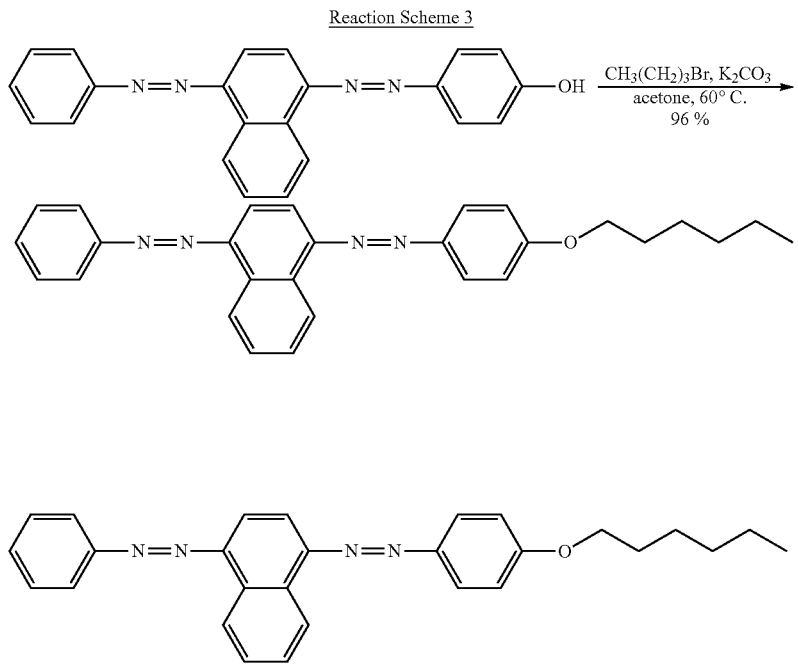

Reaction Scheme 3

Chemical Formula A

The structure of the dichroic dye represented by the above Chemical Formula A was confirmed by the $^1$H NMR analysis.

The $^1$H NMR analysis results are as follows.

$^1$H NMR (300 MHz, CDCl$_3$) δ (ppm): 0.93 (t, J=6.9 Hz, 3H, CH$_3$), 1.36 1.40 (m, 4H, CH$_2$×2), 1.49-1.56 (m, 2H, CH$_2$), 1.82-1.88 (m, 2H, CH$_2$), 4.08 (t, J=6.5 Hz, 2H, OCH$_2$), 7.06 (d, J=8.9 Hz, 2H, ArH), 7.55-7.59 (m, 3H, ArH), 7.72-7.76 (m, 2H, ArH), 7.92 (d, J=5.6 Hz, 2H, ArH), 8.06-8.09 (m, 4H, ArH), 9.01-9.04 (m, 2H, ArH).

The dichroic dye represented by the following Chemical Formula A has a solubility parameter of 23.4 and an aspect ratio of 2.6.

Fabrication of Polarization Film

Example 1

A composition for a polarization film is prepared by mixing a polymer resin including polypropylene and a polypropylene-polyethylene copolymer in a weight ratio of 7:3 (w/w) and 0.5 parts by weight of the dichroic dye prepared according to Synthesis Example 1, based on 100 parts by weight of the polymer resin.

The composition for a polarization film is melt-blended at about 250° C. using a micro-compounder (made by DSM Co.). The melt-blended composition is put in a sheet-shaped mold and pressed at high temperature under high pressure to produce a film. Then, the film is 1000% elongated in one direction (using a tensile tester made by Instron Co.) at 125° C., to yield a polarization film.

Example 2

A polarization film is fabricated according to the method described in Example 1, except that the dichroic dye was prepared according to Synthesis Example 2 instead of the dichroic dye according to Synthesis Example 1.

Comparative Example

A polarization film is fabricated according to the method described in Example 1, except that the dichroic dye was prepared according to the comparative synthesis example instead of the dichroic dye according to Synthesis Example 1.

Example 3

A composition for a polarization film is prepared by mixing a polyethylene terephthalate glycol (PETG) polymer resin and 0.1 parts by weight of the dichroic dye 1 (yellow) prepared according to Synthesis Example 1, 0.25 parts by weight of a dichroic dye 2 (red) (G241, Hayashibara Co., Ltd), and 0.1 parts by weight of a dichroic dye 3 (blue) (AC1, Nematel Co., Ltd.), based on 100 parts by weight of the polymer resin.

The composition for a polarization film is melt-blended at about 250° C. using a micro-compounder (made by DSM Co.). The melt-blended composition is put in a sheet-shaped mold and pressed at high temperature under high pressure to produce a film.

The film is then 500% elongated in one direction at 80° C. (using a tensile tester made by Instron Co.), to yield a polarization film.

Evaluation 1

The polarization films prepared as described in Examples 1 and 2 and the comparative example are evaluated regarding absorbance in a visible ray region. The absorbance is evaluated using a V-7100 UV/Vis spectrophotometer made by JASCO Inc.

Figure 3:
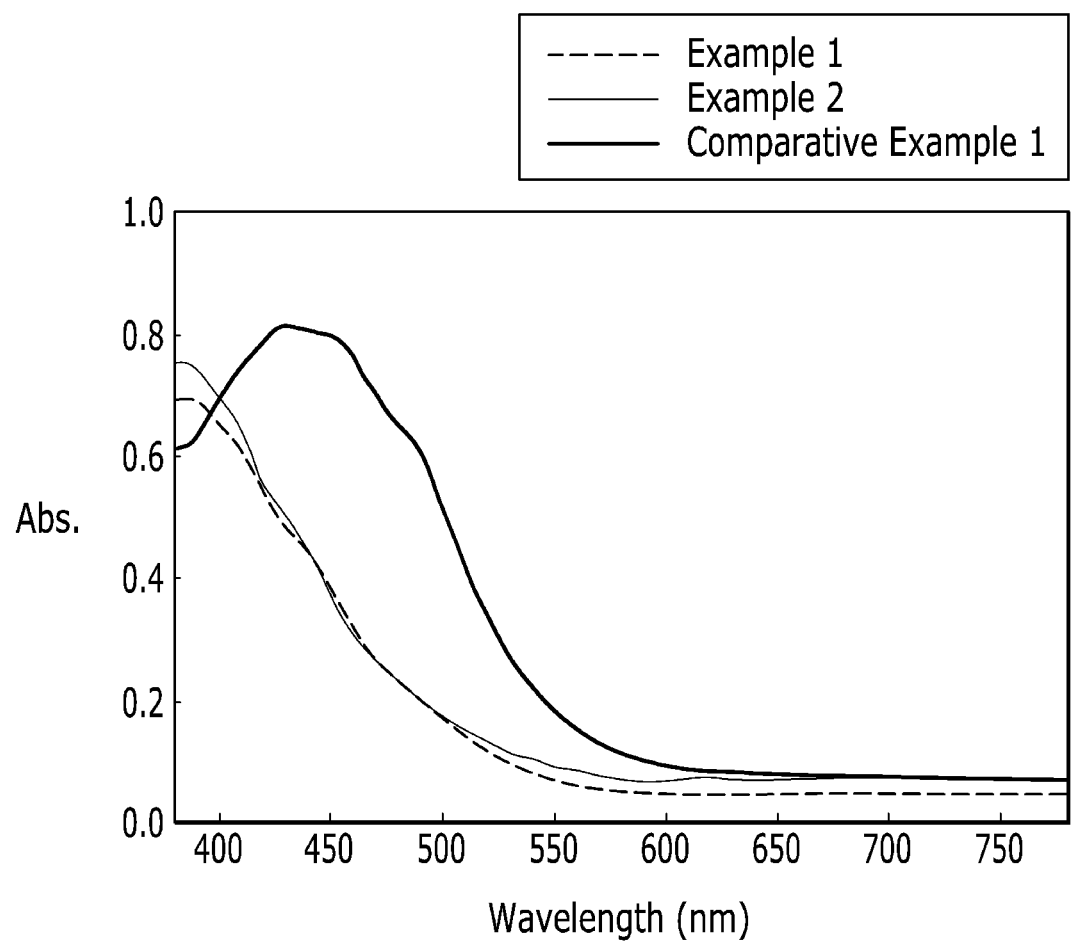
FIG. 3 is a graph showing absorbance of the polarization films according to Examples 1 and 2 and a comparative example in a visible ray region.

FIG. 3 is a graph showing absorbance of the polarization films according to Examples 1 and 2 and the comparative example in a visible ray region.

Referring to FIG. 3, the polarization films prepared according to Examples 1 and 2 have absorbance values of less than or equal to about 0.8 in a visible ray wavelength region of about 380 nm to about 780 nm. Specifically, the polarization film according to Example 1 has absorbance of about 0.69 at $\lambda_{max}$=385 nm, and the polarization film of Example 2 has absorbance of about 0.75 at $\lambda_{max}$=380 nm. On the other hand, the polarization film of the comparative example has absorbance of about 0.82 at $\lambda_{max}$=430 nm.

Evaluation 2

The polarization films prepared as described in Examples 1 and 2 and the comparative example are evaluated regarding light transmittance, polarization efficiency, and dichroic ratio.

The light transmittance is evaluated by respectively measuring light transmittance of a polarization film regarding light parallel to the transmissive axis of the polarization film and light transmittance of the polarization film regarding light perpendicular to the transmissive axis of the polarization film using a UV-VIS spectrophotometer (V-7100, JASCO).

The light transmittance measurement is used to calculate a dichroic ratio ("DR") and polarization efficiency ("PE").

The dichroic ratio is calculated according to the following Equation 1.

$$DR = Abs_\parallel / Abs_\perp \qquad \text{Equation 1}$$

In Equation 1,

DR refers to a dichroic ratio, $Abs_\parallel$ is absorbance of the polarization film regarding light parallel to the transmissive axis of the polarization film, and $Abs_\perp$ is absorbance of a polarization film regarding a light perpendicular to the transmissive axis of the polarization film.

The polarization efficiency is calculated according to the following Equation 2.

$$PE(\%) = [(T_\parallel - T_\perp)/(T_\parallel + T_\perp)]^{1/2} \times 100 \qquad \text{Equation 2}$$

In Equation 2,

PE is polarization efficiency, $T_\parallel$ is light transmittance of a polarization film regarding light parallel to the transmissive axis of the polarization film, and $T_\perp$ is light transmittance of a polarization film regarding light perpendicular to the transmissive axis of the polarization film.

Figure 4:
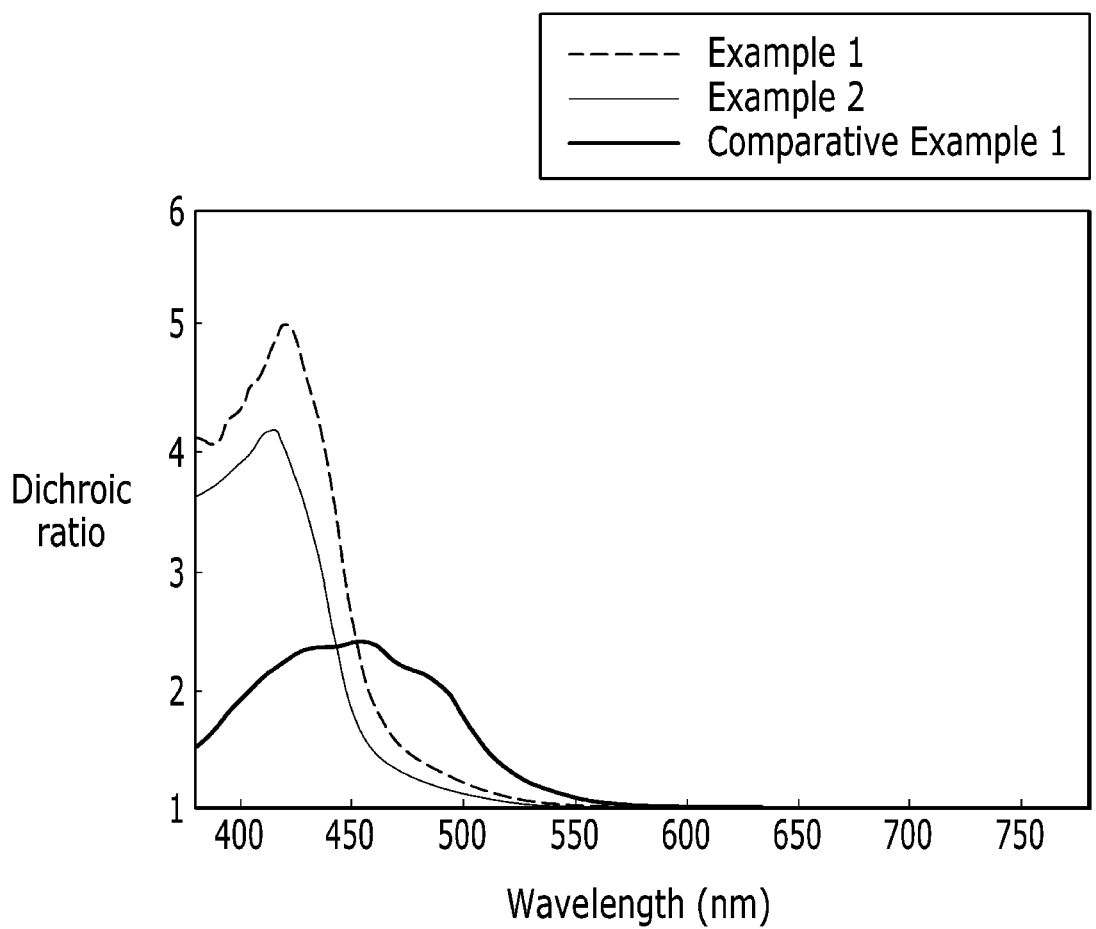
FIG. 4 is a graph showing dichroic ratios of the polarization film according to Examples 1 and 2 and a comparative example.

The results are illustrated referring to FIG. 4 and Table 1.

FIG. 4 is a graph showing dichroic ratios of the polarization films prepared according to Examples 1 and 2 and the comparative example.

TABLE 1

| | Light transmittance (Ts, %) | Polarization efficiency (PE, %) | Dichroic ratio (DR) |
|---|---|---|---|
| Example 1 | 20.23 | 99.96 | 5.06 |
| Example 2 | 17.61 | 99.93 | 4.18 |
| Comparative Example | 15.25 | 98.44 | 2.41 |

Referring to FIG. 4 and Table 1, the polarization films prepared according to Examples 1 and 2 have higher light transmittance, polarization efficiency, and dichroic ratio than the polarization film prepared according to the comparative example. Specifically, the polarization films prepared according to Examples 1 and 2 have light transmittance of greater than or equal to about 17%, polarization efficiency of greater than or equal to about 90%, and a dichroic ratio of greater than or equal to about 3 at the maximum absorption wavelength.

Evaluation 3

The polarization film according to Example 3 is evaluated regarding absorbance and dichroic ratio in a visible ray region.

Figure 5:
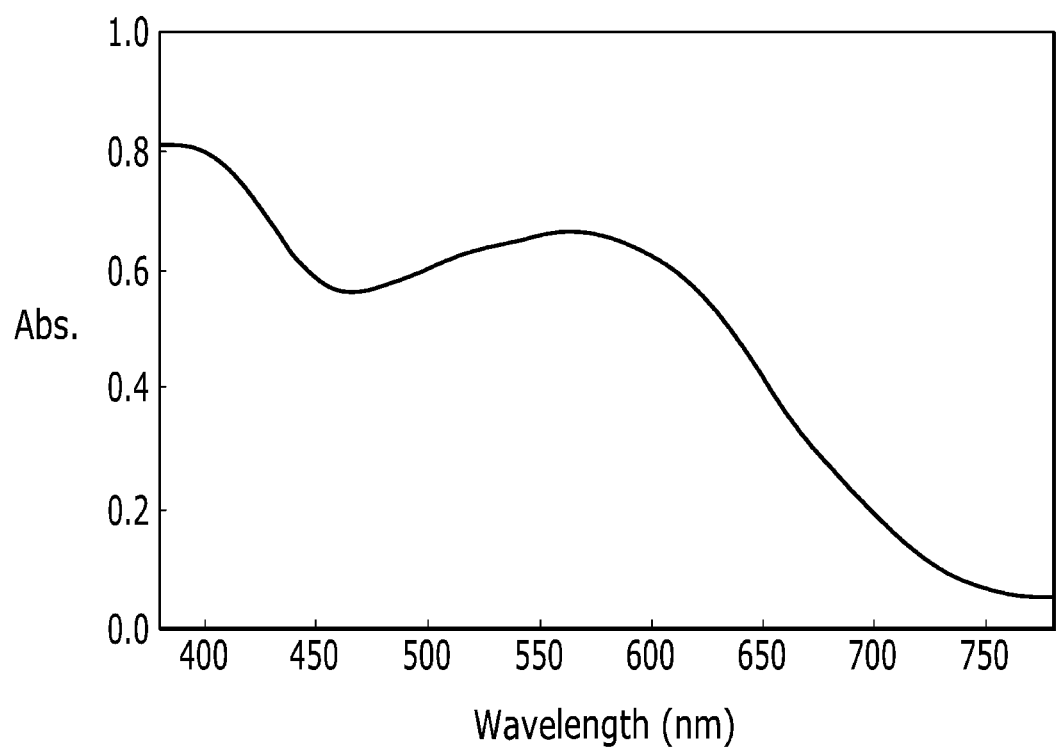
FIGS. 5 and 6 are graphs showing absorbance and a dichroic ratio of the polarization film according to Example 3 in a visible ray region.
Figure 6:
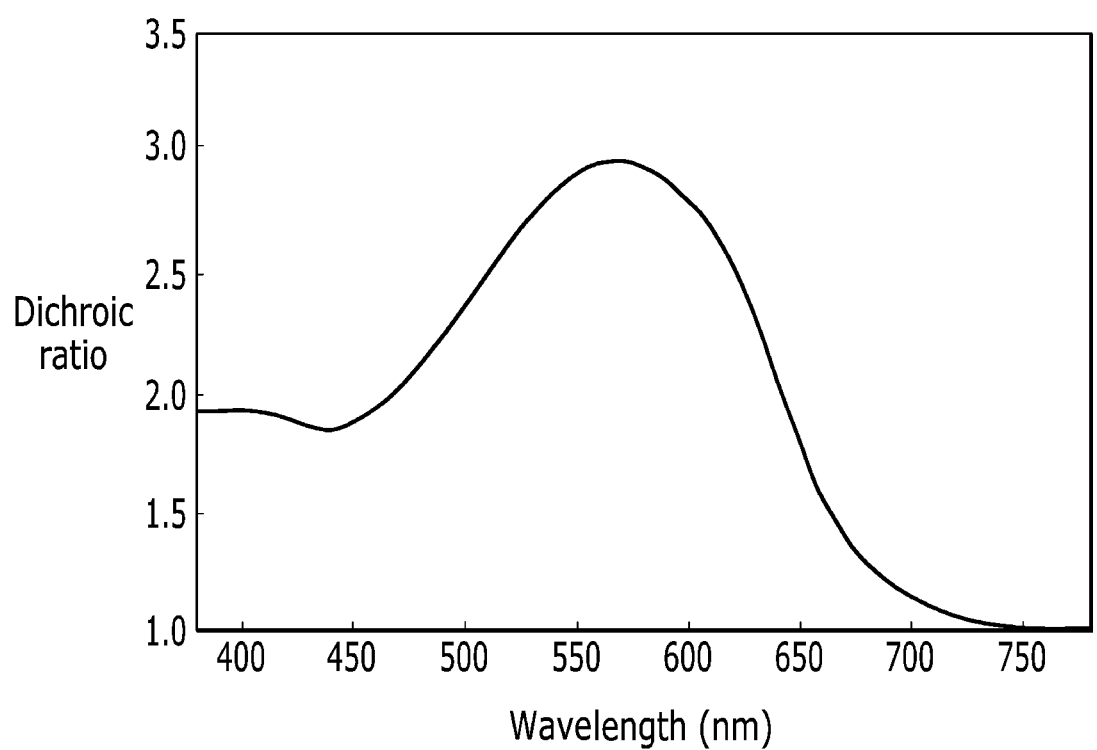

The results are illustrated referring to FIGS. 5 and 6 and Table 2.

FIGS. 5 and 6 are graphs respectively showing absorbance and dichroic ratio of the polarization film according to Example 3 in a visible ray region.

TABLE 2

| | Light transmittance (Ts, %) | Polarization efficiency (PE, %) | Dichroic ratio (DR) |
|---|---|---|---|
| Example 3 | 23.9 | 96.5 | 3.0 |

Referring to FIG. 5, the polarization film prepared according to Example 3 has the absorption characteristic in the entire visible ray wavelength region ranging from about 380 nm to about 780 nm. Referring to FIG. 6, the polarization film according to Example 3 has a dichroic ratio ranging from about 1.5 to about 3 in a broad wavelength region.

Referring to Table 2, the polarization film according to Example 3 has high light transmittance, polarization efficiency, and dichroic ratio.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarization film, comprising
a polymer resin, and
a dichroic dye dispersed in the polymer resin and represented by the following Chemical Formula 1:

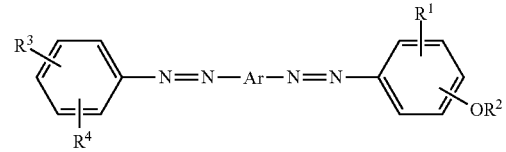

Chemical Formula 1 wherein, in Chemical Formula 1,

Ar is a substituted or unsubstituted C6 to C15 arylene group, $R^1$ is a substituted or unsubstituted C1 to C5 alkyl group, $R^2$ is a substituted or unsubstituted C2 to C20 alkyl group, a substituted or unsubstituted C3 to C20 cycloalkyl group, or a combination thereof, and $R^3$ and $R^4$ are each independently hydrogen, a substituted or unsubstituted C1 to C30 alkyl group, a substituted or unsubstituted C3 to C30 cycloalkyl group, or a combination thereof.

2. The polarization film of claim 1, wherein the dichroic dye is represented by the following Chemical Formula 1a:

Chemical Formula 1a

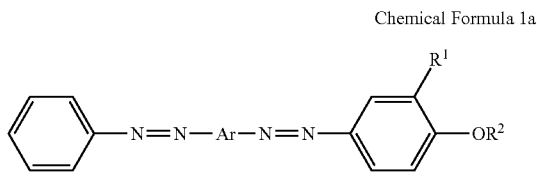

wherein, in Chemical Formula 1a,

Ar is a substituted or unsubstituted C6 to C15 arylene group, $R^1$ is a substituted or unsubstituted C1 to C5 alkyl group, and $R^2$ is a substituted or unsubstituted C2 to C20 alkyl group, a substituted or unsubstituted C3 to C20 cycloalkyl group, or a combination thereof.

3. The polarization film of claim 2, wherein Ar of Chemical Formula 1a is a substituted or unsubstituted phenylene group, a substituted or unsubstituted naphthalene group, a substituted or unsubstituted biphenylene group, or a combination thereof.

4. The polarization film of claim 1, wherein Ar of Chemical Formula 1 is a substituted or unsubstituted phenylene group, a substituted or unsubstituted naphthalene group, a substituted or unsubstituted biphenylene group, or a combination thereof.

5. The polarization film of claim 1, wherein the dichroic dye is present in an amount of about 0.01 to about 5 parts by weight based on 100 parts by weight of the polymer resin.

6. The polarization film of claim 1, wherein the dichroic dye has a dichroic ratio of about 3 to about 10 in a visible ray wavelength region of about 380 nm to about 780 nm.

7. The polarization film of claim 1, wherein the dichroic dye has absorbance of less than about 0.8 in a visible ray wavelength region of about 380 nm to about 780 nm.

8. The polarization film of claim 1, wherein the polarization film has light transmittance of greater than or equal to about 17% and polarization efficiency of greater than or equal to about 90% in a visible ray wavelength region of about 380 nm to about 780 nm.

9. The polarization film of claim 1, wherein the polymer resin is a hydrophobic polymer resin.

10. The polarization film of claim 9, wherein the polymer resin comprises a polyalkylene, a polyester, a polyamide, a copolymer of one of the foregoing polymer resins, or a combination comprising at least one of the foregoing polymer resins.

11. The polarization film of claim 9, wherein the polymer resin comprises polyethylene, polypropylene, polyethylene terephthalate, polyethylene terephthalate glycol, nylon, a copolymer of one of the foregoing resins, or a combination comprising at least one of the foregoing polymer resins.

12. The polarization film of claim 1, wherein the dichroic dye is a yellow dichroic dye, and the polarization film further comprises at least one of a red dichroic dye and a blue dichroic dye dispersed in the polymer resin.

13. The polarization film of claim 12, wherein the polarization film has absorption properties in the entire visible ray wavelength region ranging from about 380 nm to about 780 nm.

14. A display device including the polarization film according to claim 1.

15. The display device of claim 14, wherein the display device comprises a liquid crystal display or an organic light emitting diode display.

16. The display device of claim 14, wherein the polarization film has light transmittance of greater than or equal to about 17% and polarization efficiency of greater than or equal to about 90% in a visible ray wavelength region of about 380 to about 780 nm.

* * * * *